(No Model.)

T. J. PAIRPOINT.
Butter Dish.

No. 232,842. Patented Oct. 5, 1880.

Witnesses.
Chas. T. Swift
Fred'k S. Shirley

Inventor.
T. J. Pairpoint.
per T. A. Trupp atty.

UNITED STATES PATENT OFFICE.

THOMAS J. PAIRPOINT, OF NEW BEDFORD, MASSACHUSETTS.

BUTTER-DISH.

SPECIFICATION forming part of Letters Patent No. 232,842, dated October 5, 1880.

Application filed May 20, 1880. (No model.)

*To all whom it may concern:*

Be it known that I, THOMAS J. PAIRPOINT, a citizen of Great Britain, residing at New Bedford, in the county of Bristol and State of Massachusetts, have invented certain new and useful Improvements in Butter-Dishes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in an improvement in the construction of butter-dishes, whereby they are arranged so as to revolve, for greater convenience in reaching contents of dish and avoiding the annoyance consequent on reaching over and across same and soiling one's clothes, as more fully described hereinafter.

Figure 1:
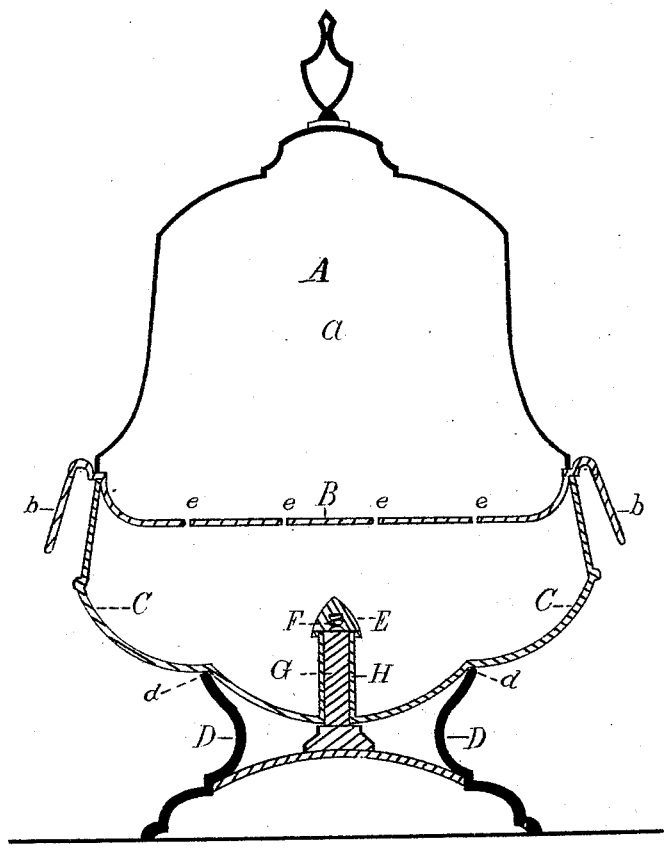

Figure 1 shows sectional drawing of my invention. A is the cover, such as is ordinarily used; B, the dish or butter-holder, which is provided with holes $e\ e\ e$, to drain any excess of moisture. C is the bowl-shaped body or dish-holder, having the sleeved center H arranged to turn on pin G. The pin G is provided with a thread, F, at its top for cap or nut E, which secures the body part on same and prevents its lifting off. The nut E has a shield projecting down around sleeve, to prevent any moisture passing down same. D is the base or supporting portion, to which the pivot-pin G is firmly attached. $d\ d$ is an enlarged seating, to aid in supporting dish to revolve steadily.

Figure 2:
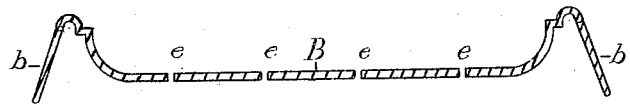

Fig. 2 shows the dish or butter-holder removed from bowl or body part. $b$ shows the elongated edge, forming a belt or band, which may be made in any desired form or may be decorated in colors.

In using ordinary butter-dishes as now arranged they prove annoying and are defective, owing to the fact that the person last using it will invariably deposit knife on the side nearest to him, and the next user has to pass his hand across the butter to obtain the knife, and frequently catches his or her sleeve in same. My improvement entirely obviates this, as a slight touch will revolve the dish and bring the knife directly to hand.

In carrying out my invention I construct the body parts A, C, and D by spinning, pressing, or other suitable means best adapted for the material they are formed of, and I arrange the body part so it can be attached to lower part or base and be supported on same, and turn around on a suitable pivot or turning point. This can be best arranged by a sleeve, as shown, and so give a broad bearing and steady its turning. I provide the upper portion of pivot with a suitable cap or shield, E, so as to shed any drip from the drainer and avoid its leakage through pivot when any drainings pass into body part C, which is arranged to receive it, or this body part may be used for broken ice, so as to act as a cooling medium for butter. The base part D is arranged so as to support the movable dish at a circle-point from center, so as to steady same. The body C is provided with suitable projections for holding or retaining the knife on its side, and has a butter-holder or dish. This can either be in one piece with the body or arranged with a removable glass dish or holder. In present arrangement I show this with a projecting flange or edge turning down and around dish-holder. This can be cut or ornamented in color and greatly improve the beauty of the article. The cover is arranged in the usual manner, or can be seated inside dish on a seating provided for the purpose.

Having described my invention, what I claim is—

1. As a new article of manufacture, a butter-dish having the body C, and a butter holder or plate, B, arranged to turn on its base or support, substantially as described.

2. The revolving butter-dish, arranged to rotate on its base or support, substantially as shown.

3. In a butter-dish, the combination of the body part or dish-holder C and the base or stand D, having the pivot or turning point for body to turn on, substantially as described.

4. In a revolving butter-dish, the pivot or turning point G, in combination with a movable socket or sleeve, H, formed in the body of the holder, the pin or pivot terminating within the body, and being provided with a cap or shield, E, arranged and provided for the purpose specified.

In testimony whereof I affix my signature in presence of two witnesses.

THOMAS J. PAIRPOINT.

Witnesses:
FREDK. S. SHIRLEY,
THOMAS A. TRIPP.